US010363631B2

(12) United States Patent
Enneking et al.

(10) Patent No.: US 10,363,631 B2
(45) Date of Patent: Jul. 30, 2019

(54) NEUTRON IRRADIATED MATERIAL REPAIR

(71) Applicant: Framatome Inc., Lynchburg, VA (US)

(72) Inventors: Jeffrey A. Enneking, Forest, VA (US); Brian W. Ring, Appomattox, VA (US)

(73) Assignee: Framatome Inc., Lynchburg, VA (US)

(*) Notice: Subject to any disclaimer, the term of this patent is extended or adjusted under 35 U.S.C. 154(b) by 532 days.

(21) Appl. No.: 14/721,834

(22) Filed: May 26, 2015

(65) Prior Publication Data

US 2016/0351281 A1    Dec. 1, 2016

(51) Int. Cl.
*B23K 26/144* (2014.01)
*B23K 26/34* (2014.01)
(Continued)

(52) U.S. Cl.
CPC ........ *B23K 26/144* (2015.10); *B23K 26/0884* (2013.01); *B23K 26/127* (2013.01); *B23K 26/1224* (2015.10); *B23K 26/32* (2013.01); *B23K 26/34* (2013.01); *B23K 26/361* (2015.10); *B23P 6/00* (2013.01); *G21C 13/087* (2013.01); *G21C 19/02* (2013.01); *G21C 19/20* (2013.01);
(Continued)

(58) Field of Classification Search
CPC ...... G21C 21/18; G21C 13/087; G21C 19/02; G21C 19/20; G21C 21/00; B23K 26/144; B23K 26/342; B23K 26/36; B23K 2201/12; B23K 2203/04; B23K 2203/26; B23K 26/0884; B23K 26/1224; B23K 26/127; B23K 26/32; B23K 26/34; B23K 26/361; B23K 20/12–1295; B23P 6/00

USPC ................. 219/76.1, 121.6, 75, 69.17, 121.7
See application file for complete search history.

(56) References Cited

U.S. PATENT DOCUMENTS 4,411,730 A * 10/1983 Fishter ...................... C23F 1/28
                                                                    216/108
5,443,201 A     8/1995  Cartry
(Continued)

FOREIGN PATENT DOCUMENTS

JP           11281790 A  * 10/1999  ............. B23K 20/12
JP      2001242280 A  *  9/2001
(Continued)

OTHER PUBLICATIONS

English translation of JP 2013108918 A.*
(Continued)

*Primary Examiner* — Ibrahime A Abraham
*Assistant Examiner* — Chris Q Liu
(74) *Attorney, Agent, or Firm* — Davidson, Davidson & Kappel, LLC

(57) ABSTRACT

The invention is a process of repairing cracked or microstructurally damaged portions of irradiated materials, such as nuclear reactor pressure vessels and shrouds. A damaged portion of the irradiated substrate is first removed, such as by electrical discharge machining (EDM). After removing the damaged portion, the recast layer inherent in the EDM process is then removed. Once the repair area substrate material has been removed to a calculated depth, the created cavity is then filled without releasing transmutated elements within the irradiated material. A chamber may be placed on the irradiated material surrounding the repair area to create an isolated work space.

10 Claims, 7 Drawing Sheets

(51) Int. Cl.
*G21C 21/00* (2006.01)
*B23P 6/00* (2006.01)
*B23K 26/361* (2014.01)
*B23K 26/08* (2014.01)
*B23K 26/12* (2014.01)
*B23K 26/32* (2014.01)
*G21C 13/087* (2006.01)
*G21C 19/02* (2006.01)
*G21C 19/20* (2006.01)
*B23K 101/12* (2006.01)
*B23K 103/04* (2006.01)
*B23K 103/18* (2006.01)

(52) U.S. Cl.
CPC .......... *G21C 21/00* (2013.01); *B23K 2101/12* (2018.08); *B23K 2103/04* (2018.08); *B23K 2103/26* (2018.08); *Y02E 30/40* (2013.01)

(56) References Cited

U.S. PATENT DOCUMENTS

| | | | |
|---|---|---|---|
| 5,654,992 A * | 8/1997 | Uraki | G21C 5/10 219/82 |
| 6,211,482 B1 | 4/2001 | Findlan et al. | |
| 7,022,938 B2 * | 4/2006 | Tamura | B23K 26/123 219/121.64 |
| 7,146,725 B2 | 12/2006 | Kottilingam et al. | |
| 7,810,237 B2 | 10/2010 | Lange et al. | |
| 8,322,008 B2 | 12/2012 | Van Rooyen et al. | |
| 8,360,302 B2 | 1/2013 | Richter | |
| 8,629,368 B2 | 1/2014 | Mazumder et al. | |
| 2002/0104831 A1 * | 8/2002 | Chang | B23K 26/0075 219/121.7 |
| 2003/0128794 A1 * | 7/2003 | Kurosawa | G21C 17/007 376/260 |
| 2005/0061853 A1 * | 3/2005 | Packer | B23K 20/123 228/112.1 |
| 2005/0178750 A1 * | 8/2005 | Cheng | B23K 26/147 219/121.64 |
| 2007/0123061 A1 * | 5/2007 | Evertsen | H01L 21/02076 438/795 |
| 2011/0168679 A1 * | 7/2011 | Qi | B23K 26/36 219/75 |
| 2012/0160443 A1 | 6/2012 | Shuck | |
| 2013/0086785 A1 * | 4/2013 | Cui | B32B 15/01 29/402.18 |
| 2014/0259666 A1 | 9/2014 | Baughman et al. | |
| 2014/0259668 A1 | 9/2014 | Henderson et al. | |
| 2015/0034603 A1 * | 2/2015 | Oliver Vargas | B23H 9/10 219/69.17 |
| 2015/0048059 A1 | 2/2015 | Kurosawa et al. | |

FOREIGN PATENT DOCUMENTS

JP 2013108918 A * 6/2013
WO 94/19141 9/1994

OTHER PUBLICATIONS

English translation of JP-11281790-A.*
English translation of JP-2001242280-A.*
Van Rooyen, Corney et al., "In-Situ Crack Repair by Laser Cladding," CSIR 3rd Biennial Conference: Science Real and Relevant, CSIR International Convention Centre, Pretoria, Aug. 30-Sep. 1, 2010.
"Advanced photonics manufacturing facility to ensure new laser-based products," ScienceScope vol. 6, No. 2, Apr. 2012, pp. 64-65.

* cited by examiner

NEUTRON IRRADIATED MATERIAL REPAIR

BACKGROUND OF THE INVENTION

1. Field of the Invention

The present invention relates to repair method, and, more particularly, the present invention relates to weld repair of irradiated materials.

2. Description of the Related Art

While the disclosed invention can be used in a variety of industries, the environment of a nuclear utility will be discussed herein for exemplary purposes. Nuclear utilities have a need to verify the integrity of their aging components within nuclear reactors and other plant systems. The neutron fluence in the reactor vessel core produces accumulated damage, and helium (He) and hydrogen (H) gas, through transmutation reactions. Thus, the reactor vessel internals are at risk of radiation embrittlement (irradiation-assisted stress corrosion cracking, or IASCC). Additionally, the reactor vessel material and cladding can become embrittled.

Current weld repair technologies and process sequencing are not appropriate for irradiated material because they require a high ratio of energy/mass deposited and impart too much energy to the substrate irradiated material under repair. Machining techniques that produce chips are a foreign material exclusion (FME) risk to the primary coolant system of a reactor. Additionally, previously wetted surfaces and/or cracked surfaces are at risk of boric acid contamination prior to weld repair.

There exists a need for a base material repair technique which permits a repair to the reactor materials and produces a true metallurgical bond. This repair technique must be made with low energy techniques that limit the diffusion of transmutated He and H gas species which produce porosity and cracking in the substrate. Additionally the technique will limit the risk of cracking caused by residual stresses in embrittled low alloy steels.

SUMMARY OF THE INVENTION

The invention is a process of repairing cracked portions of irradiated materials or portions of materials that have accumulated neutron irradiation damage, such as nuclear reactor pressure vessels and shrouds. As an initial step, a damaged portion of the irradiated substrate is removed, such as by electrical discharge machining (EDM). EDM is a preferred method of removal because other machining techniques would create "chip" debris, which is undesirable because of the irradiated nature of the substrate and because it would create a risk of foreign objects near or within the pressure vessel that must then be accounted for. After removing the damaged portion, the recast layer inherent in the EDM process is then removed. Laser ablation is a preferred process for removing the recast layer. Alternate methods, such as chemical striking and mechanical abrasion, may also be available.

Once the repair area substrate material has been removed to a calculated depth, the created cavity is then filled. This may be done by coaxial powder injection laser welding, which entails injecting powder into a laser to instantaneously fuse the powder and substrate. This process beneficially does not heat the substrate as other welding techniques do. Heating of the substrate is undesirable because such heating promotes diffusion of helium and hydrogen that is entrapped within the irradiated substrate, causing porosity and or cracking in the weld and weld heat affected zone.

If there is moisture within the crack being repaired, a chamber may be placed about the repair area and placed under a vacuum to dry out the moisture prior to powder injection welding. If the crack being repaired is a through-crack, the chamber may be placed in a hyperbaric condition with a positive pressure of an inert gas to expel the moisture from the crack.

DESCRIPTION OF THE DRAWINGS

The present invention is described with reference to the accompanying drawings, which illustrate exemplary embodiments and in which like reference characters reference like elements. It is intended that the embodiments and figures disclosed herein are to be considered illustrative rather than restrictive.

DETAILED DESCRIPTION OF THE INVENTION

Figure 1:
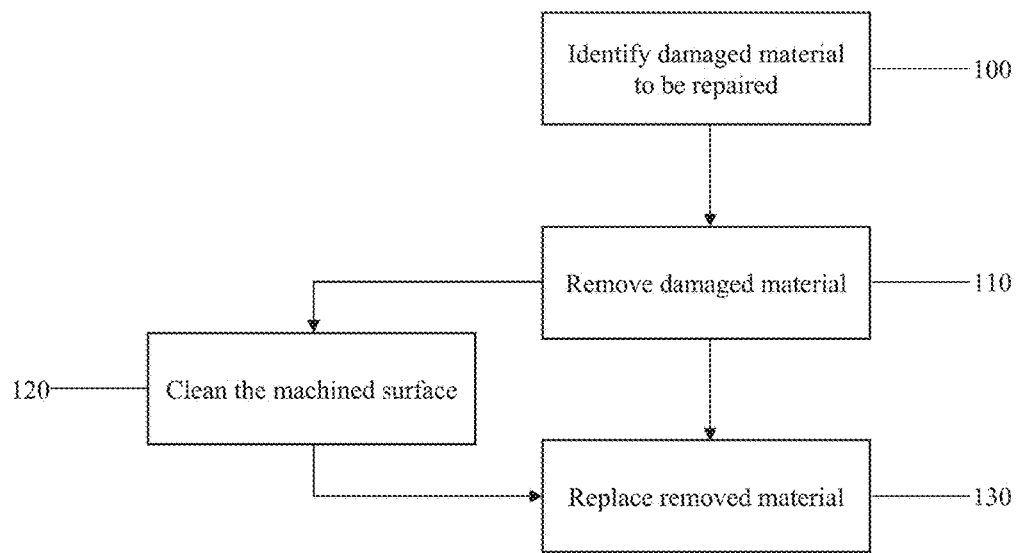
FIG. 1 shows a flow chart for a repair process of the present invention.

FIG. 1 shows a flow chart for a repair process of the present invention. The method begins at step 100 in which a damaged portion of an irradiated metal is identified. This identification can be performed by visual inspection, ultrasonic testing, or other non-destructive examination (NDE) methods. NDE provides detailed information about the flaw(s) present in the damaged material, including the depth and thickness thereof. Thus, through this identification the amount of material that must be removed from the damaged metal is determined.

Once the portion of the irradiated metal to be repaired has been identified, the next step 110 is to remove the damaged portion of the irradiated metal. This should be done while minimizing strain and deformation of the remaining section of the irradiated metal so that any transmutated He or H therein will not be released. Electrical discharge machining (EDM) is a preferred method of excavating the damaged metal. EDM uses electrical discharges between an electrode and the workpiece to remove material from the workpiece. An electrical discharge or "spark" is created between the electrode and the workpiece, producing intense heat that vaporizes a portion of the workpiece. The spark is controlled and localized so that it only affects the excavated surface of the workpiece material and does not affect the material properties below the excavated surface. Demineralized water can be used to flush any generated swarf from the area under repair.

The EDM process may utilize a sinker-type electrode, harp-type electrode, or scoop type-electrode configuration to produce the excavation repair cavity. The dielectric to be utilized in this submerged process is deionized or demineralized water. The power supply can be set as electrode positive or electrode negative dependent upon the electrode material type (graphite, Cu—W, Ag—W). The operational discharge is performed by high frequency pulsing of the discharge power supply. A gap sensing circuit is utilized to control a motorized electrode advance and retract function to maintain consistent discharge machining and permit flushing of the swarf debris. The electrodes are designed to provide for flushing channels and injection paths.

One advantage of the EDM process is that it limits the strain and deformation to the substrate produced by traditional machining methods. Additionally, the debris created by EDM is in the form of a fine particulate that can be removed in-situ. Thus, the risk of introducing foreign material, which could damage the reactor and fuel, is minimal compared to traditional machining techniques. The EDM process also removes the boric acid contamination and surface oxides.

Figure 2:
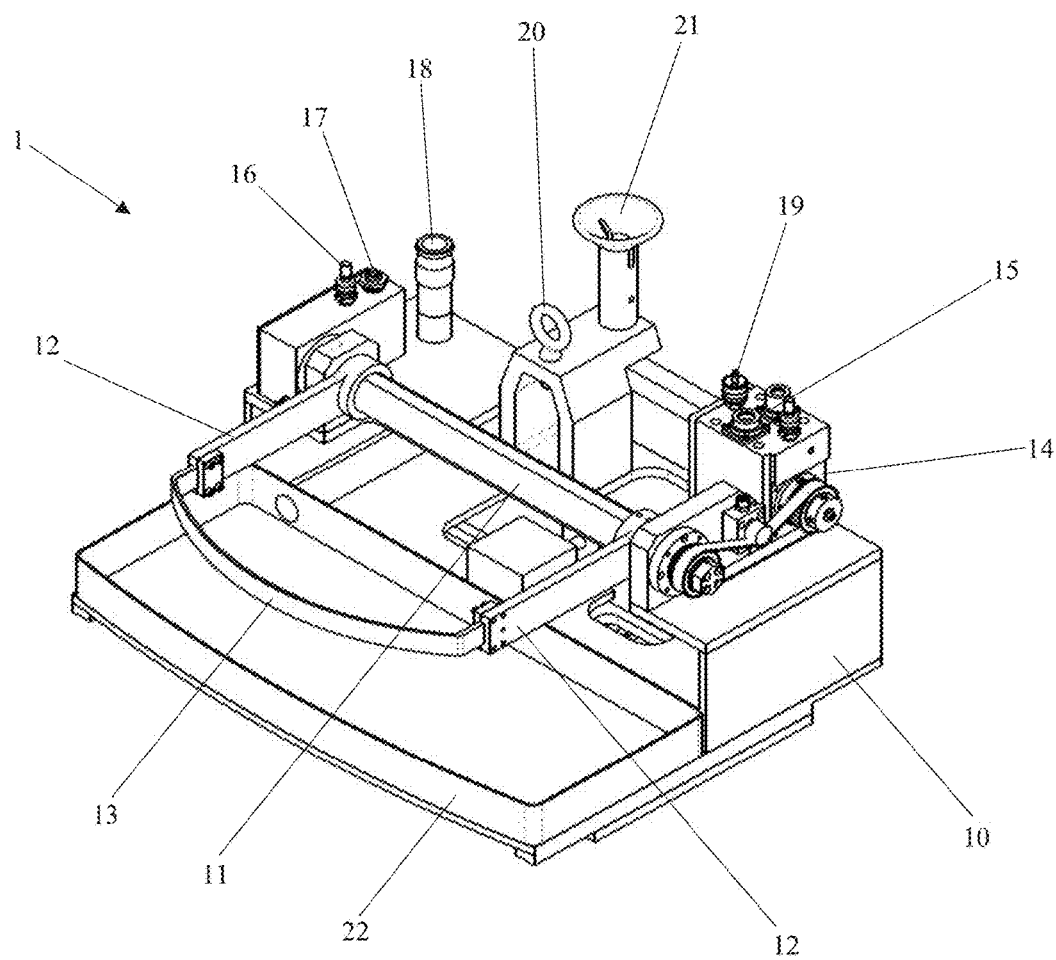
FIG. 2 shows a perspective view of an electrical discharge machining tool for use in the present invention.
Figure 3:
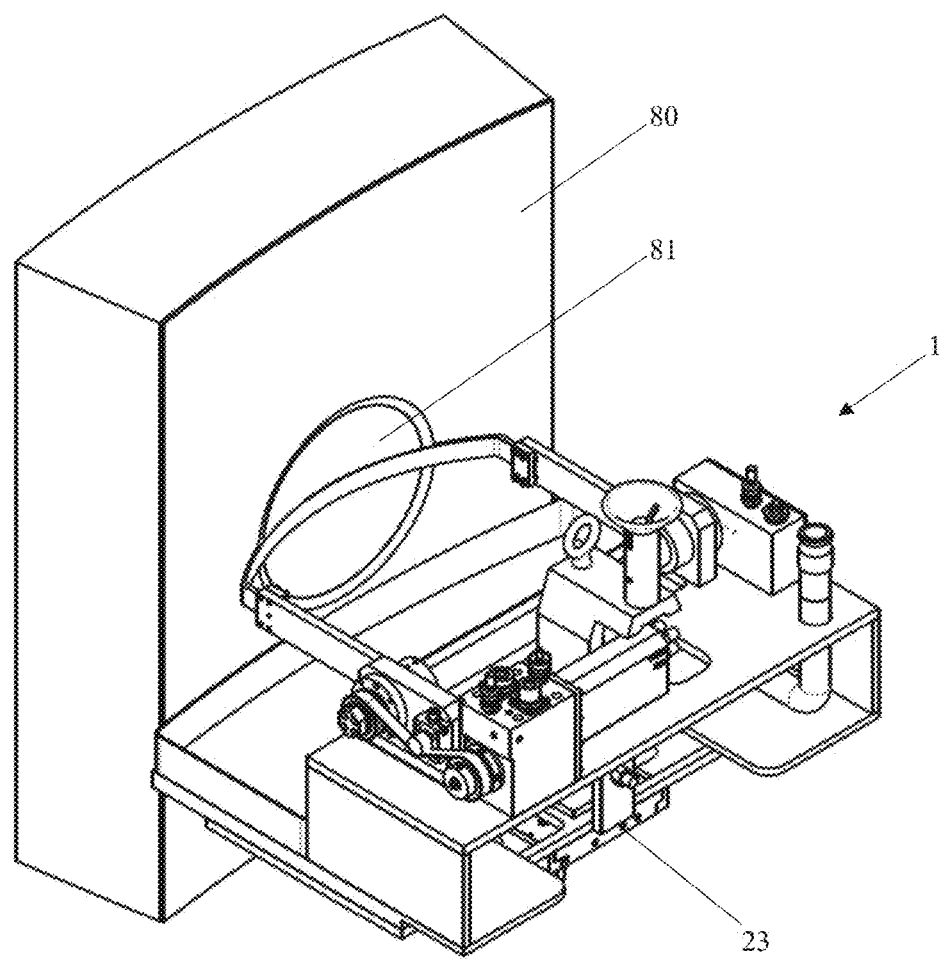
FIG. 3 shows the electrical discharge machining tool of FIG. 2 in a use position according to the present invention.

FIG. 2 shows a perspective view of a preferred EDM tool 1 for use in the present invention, and FIG. 3 shows the EDM tool 1 of FIG. 2 in a use position to repair a vessel wall 80. The tool 1 includes a base 10 upon which a rotary shaft 11 is mounted. Two electrode mount arms 12 are rotatably mounted on the shaft 11. An electrode 13 is coupled to the mount arms 12. A harp- or wire-type electrode 13 is shown in the illustrated embodiment. A rotary drive assembly 14 and electrical control connections 15 are provided to rotate the mount arms 12 and electrode 13 about the shaft 11. Additional connections are provided on the base 10 to provide demineralized water (connection 16), EDM electrical current (connection 17), swarf suction (connection 18), and purge air (connection 19). A rigging eyebolt 20 and handling pole connection 21 are provided to facilitate placement of the tool 1 into the desired use position. A catch pan 22 is coupled to the base 10 to collect and retain swarf and the removed portion of the wall 80 during use. The base 10 further includes railing 23 on a lower surface thereof so that the tool 1 can be moved left, right, forward, and backward relative the wall 80 to be repaired. Mounting connections 24 may be included on the underside of the railing 23 for mounting the tool 1 to a stand (not shown) during use.

Figure 4:
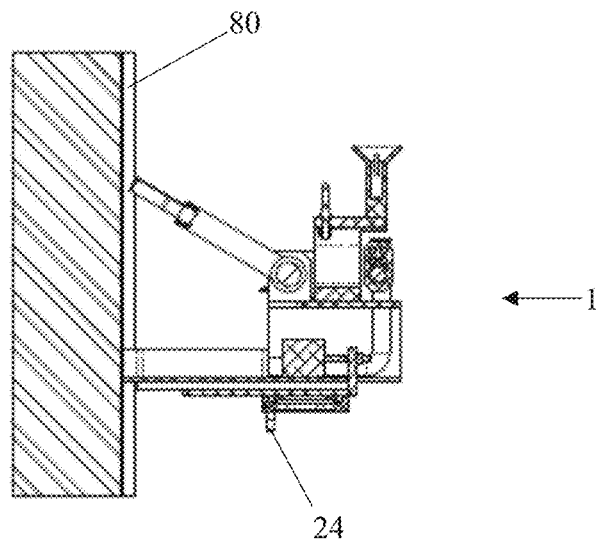
FIG. 4 shows a side view of the tool of FIG. 2 in a first position relative the vessel wall during use.
Figure 5:
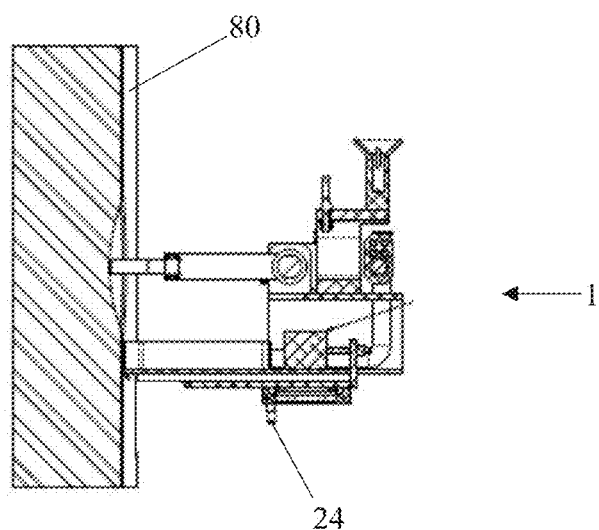
FIG. 5 shows a side view of the tool of FIG. 2 in a second position relative the vessel wall during use.

In use, the tool 1 is placed in position relative the vessel wall 80 in a known manner. The tool 1 is positioned such that rotation of the curvature of the wire-type electrode 13 will remove the damaged portion of the wall 80. The tool 1 and electrode 13 are powered, and the rotary drive assembly 14 is engaged to rotate the electrode 13 toward the wall 80. The powered electrode 13 is rotated into engagement with the wall 80, and the rotation is continued until the electrode 13 exits the wall 80. In this manner, a volume of the vessel containing the damaged material is removed, creating a crater in the wall having an outer surface 81. The wall 80 illustrated in the figures includes a layer of cladding thereon. FIGS. 4 and 5 show side views of the tool 1 and vessel wall 80 at various positions during use.

The EDM process inherently creates a recast layer, also called a white layer, on the workpiece where EDM has altered the metallurgical structure of the workpiece. This recast layer may include a fine layer of oxide. It may be desirable to remove this recast layer (including any oxide) to prepare the surface for welding by performing a cleaning step 120 after the EDM process. There are a variety of ways in which the recast layer can be removed. For example, chemical striking with a pickling solution or a mechanical abrasive (wet or dry) process can be used. Laser ablation is a preferred process for removing the recast layer. The surface exposed by the EDM process is irradiated with a laser beam and the absorbed laser energy vaporizes the recast layer material, exposing the underlying substrate metal material which is readily weldable.

The laser ablation process is typically performed in a pulsed mode at a high energy density ($J/cm^2$) and power density ($Watt/cm^2$) such that vaporization of material may occur. This typically requires a smaller focused spot size in comparison to laser welding. The ablated material must be evacuated from the area. The process may be performed in an environment of inert gas (such as argon or helium) or a vacuum. Some level of ablation can occur during the welding process if the beam is rastered or bifurcated ahead of the weld pool.

Typically the ablation process is performed prior to welding. Test assemblies are used to verify parameters and procedures to ensure adequate ablation and coverage prior to executing the laser ablation process on the workpiece.

After the damaged portion of the metal has been removed and the surface has been prepared for welding, the next step 130 is to replace the removed volume. While it is preferable to replace the same volume of material that was removed, such exacting precision is not necessary and is not contemplated by "replacing" as used herein.

One preferred method of replacing the removed volume is powder injection laser welding, which entails injecting powder around/in a focused laser spot to instantaneously fuse the powder and substrate. This may preferably include injecting the powder coaxially to the laser. This process has a low energy to mass deposition ratio that beneficially does not heat the substrate as other welding techniques do. As used herein, an energy to mass powder flow rate (J/g) of less than 10 KJ/g mass is considered a low energy deposition rate, with a powder deposition efficiency ranging from 40 to 65%. Heating of the substrate is undesirable because such heating promotes diffusion of the He and H that is entrapped within the irradiated substrate, causing porosity and/or cracking in the welds. The powder material is provided in a cone-shape and positioned on the surface and heated with the laser to instantaneously fuse the powder and surface material. This process is continued until the removed volume has been filled as desired. If the cleaning step includes laser ablation, the same laser may be used to perform the coaxial powder injection laser welding.

Figure 6:
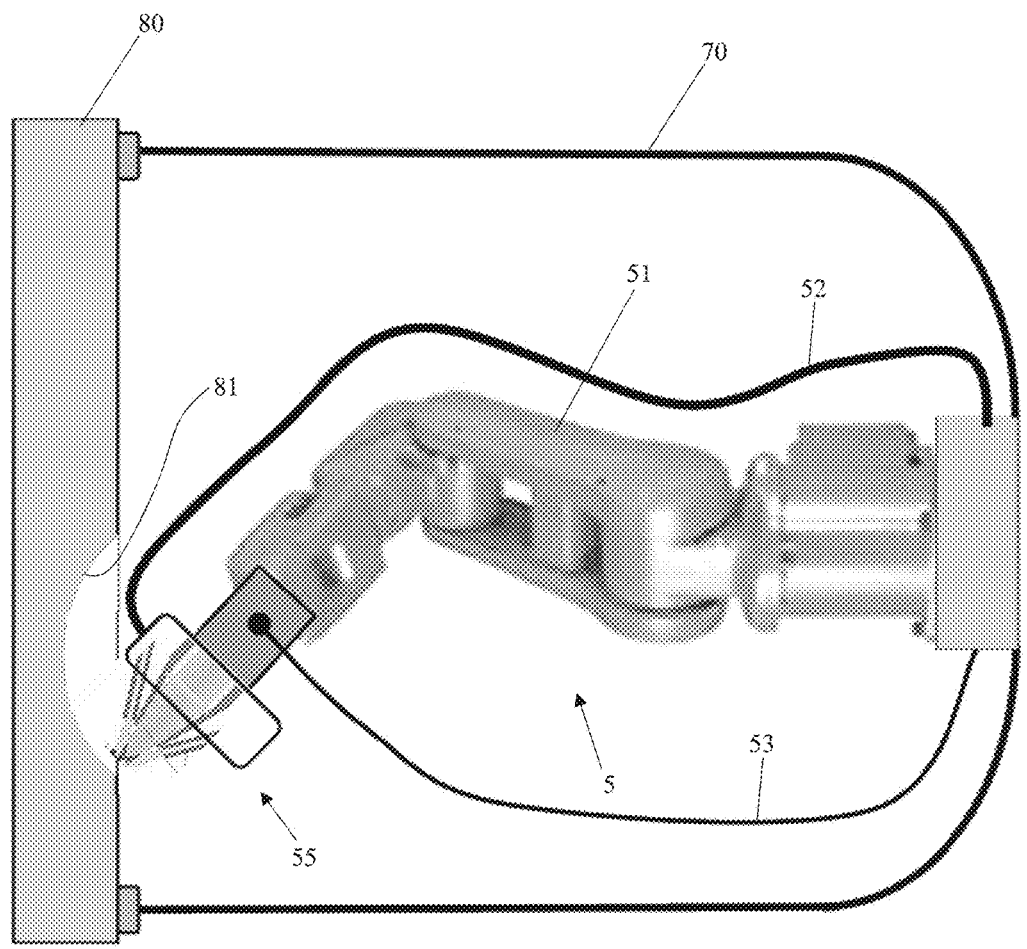
FIG. 6 shows an outline drawing of a coaxial powder injection laser welding tool with a chamber for use in the present invention.
Figure 7:
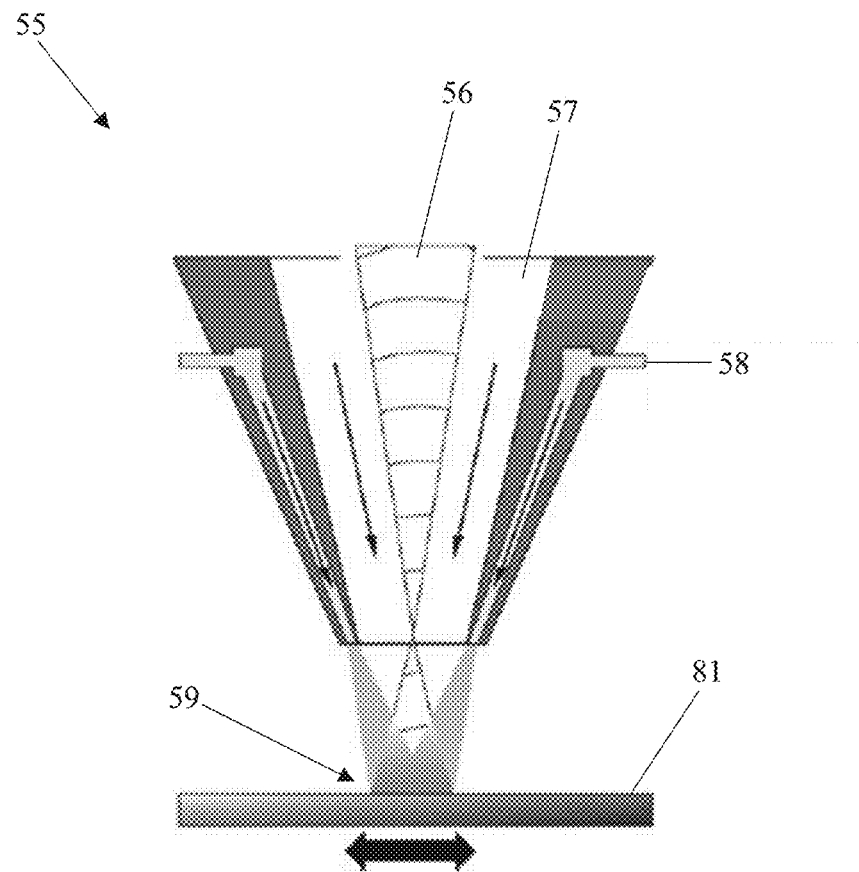
FIG. 7 shows a close-up image of the laser and powder injection portion of the tool of FIG. 6.

FIG. 6 shows a coaxial powder injection laser welding tool 5 for use in the present invention, and FIG. 7 shows a close-up image of the laser and powder injection portion of the tool 5 of FIG. 6. The tool 3 includes robotics 51, 52, 53 that allow the head 55 to be translated and rotated about three orthogonal axes. The tool 3 includes a robotic manipulator 51 with pitch, yaw, and roll at the end effector or head 55. Preferably, as shown in the illustrated example, the manipulator 51 is a six-axis robot. The tool 3 may include a powder feed line 52 and an optical fiber 53 for the laser. The head 55 includes a laser 56 in a central location and directed at a focus point 59. A cone of shielding gas 57 surrounds the laser 56. A powder supply 58 feeds powder to the focus point 59, where the laser 56 fuses the powder to the surface 81 under repair. A collimating lens package (not shown) may also be provided.

An example laser system is a neodymium-doped yttrium aluminum garnet (Nd:YAG) 1064 nm wavelength system with fiber optic delivery and transmissive optics. However, other laser wavelengths (i.e. 800 to 940 nm) that work with fiber optics could also be used Example deposition rates are on the order of 0.4 to 0.6 lb/hr (3 g/min to 4.5 g/min), and track widths on the order of 0.6 to 3 mm are typical. A preferred standoff distance for the powder nozzle is 5 to 15 mm.

If any moisture is present within the void, it should be removed prior to replacing the removed material. A preferred method of removing such moisture is to provide a chamber 70 around the void to isolate it, and using a vacuum to pull moisture out of the void. Tooling and materials to replace the removed material can then be inserted into the dry chamber and used to replace the removed material. The chamber may be put in place at the beginning of the repair process.

Figure 8:
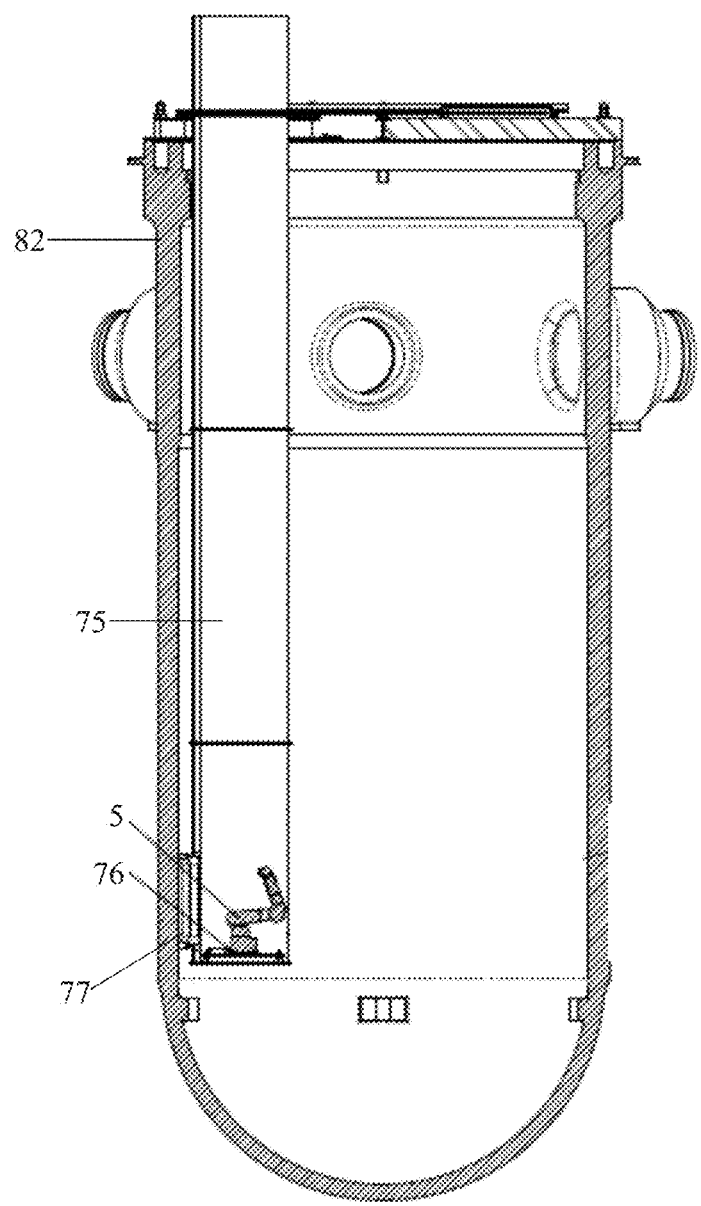
FIG. 8 shows an alternative access trunk design in a non-flooded reactor cavity.

FIG. 8 shows an alternative access trunk design 75 for use in the present invention in a non-flooded reactor cavity in lieu of the chamber 70. In the illustrated embodiment, the trunk 75 extends from atop the reactor vessel 82 and extends down to the location of the surface to be repaired. The trunk 75 may include a mounting plate 76 to which tooling, such as the coaxial powder injection laser welding tool 5, can be attached. Additional equipment such as pumps (not shown) may also be included to remove reactor vessel water from the trunk 75. The trunk 75 preferably includes a seal 77, such as a bellows, to form a foreign matter exclusion seal to prevent debris from entering the reactor vessel 82.

In some instances, the damaged material may contain cracks that extend completely through the material to be repaired. In these instances, it will be necessary to prevent moisture from entering into the area being repaired. In this instance a chamber is positioned about one side of the void, and a positive pressure is used to push the moisture out of the chamber and void. The chamber is placed in a hyperbaric condition with a positive pressure of an inert gas to expel the moisture from the crack. The replacement tooling and materials can then be inserted and/or manipulated in the dry chamber and used to replace the removed material.

Another method of repairing a damaged portion of the workpiece is friction stir welding (FSW). FSW is a joining process in which the metals being joined are not melted. Rather, the bodies to be joined are placed adjacent each other and held together with some amount of force. A rotating tool is used to generate heat along the junction between two facing surfaces, causing a plasticized zone to form in the materials around the tool. The softened metal can then be joined using mechanical pressure. The plasticized zone creates a metallurgical bond under the rotating tool. FSW can be used directly on the damaged portion of the workpiece with no added metal, after removing at least a part of the damaged portion without added metal, or by removing the damaged portion and preparing a replacement metal portion which fits the removed volume, the replacement metal being welded in place by FSW.

The process flow described herein provides for a technological means to produce weld repairs on ferritic, austenitic, and nickel based alloys that have neutron irradiation damage and embrittlement. The method improves the quality and volumetric acceptability of the weld repair by removing the defects when possible, eliminating the high irradiation damaged surface, eliminating boric acid contamination, eliminating moisture, and utilizing a low energy/mass deposited process which limits the evolution of porosity and cracking from transmutated gas species or elemental segregation. Coaxial powder injection provides for a low energy/mass deposit, limiting substrate heating. The process flow demonstrates a sequence of technological steps for in-situ reactor vessel and reactor vessel internals repair.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A method of repairing a neutron irradiated damaged metal of a part in a nuclear power plant, comprising:
   identifying a damaged portion of the irradiated metal to be repaired on the part;
   removing a volume of the irradiated metal to create a cavity, the volume including the damaged portion, said removing creating a surface formed by a recast layer in the cavity;
   cleaning the surface to remove the recast layer; and
   replacing the volume with a replacement material that at least partially fills the cavity without melting the part, wherein said replacing includes performing powder injection laser welding to replace the removed volume.

2. The method of claim 1, wherein said cleaning includes at least one of chemical striking, mechanical abrasion, and laser ablation.

3. The method of claim 1, wherein said replacing further includes maintaining an energy to mass powder flow rate of less than 10 KJ/g mass.

4. The method of claim 1, wherein said cleaning includes laser ablation.

5. The method of claim 1, wherein:
   said cleaning includes laser ablation with a laser; and
   said replacing includes performing powder injection laser welding with a laser.

6. The method of claim 5, wherein said cleaning and said replacing are performed using the same laser.

7. The method of claim 1, wherein said removing includes utilizing electrical discharge machining.

8. The method of claim 1, further comprising
   placing a chamber on the damaged metal to create a zone encircling said volume; and
   evacuating any moisture from the zone prior to said replacing.

9. A system for repairing a neutron irradiated damaged metal of a part in a nuclear power plant, comprising:
   means for identifying a damaged portion of the irradiated metal to be repaired on the part;
   means for removing a volume of the irradiated metal to create a cavity, the volume including the damaged portion, said removing creating a surface formed by a recast layer in the cavity;
   means for cleaning the surface to remove the recast layer; and
   powder injection laser welding means for replacing the volume with a replacement material that at least partially fills the cavity without melting the part.

10. The system of claim 9, wherein:

said means for cleaning includes means for performing laser ablation;

said means for replacing includes means for performing powder injection laser welding; and said means for performing laser ablation and said means for performing powder injection laser welding include the same laser.

* * * * *